Sept. 29, 1970 R. KOBLER ET AL 3,531,575

REPEAT MAGNETIC TAPE MACHINE

Filed Sept. 3, 1968 4 Sheets-Sheet 1

INVENTORS
RICHARD KOBLER
BRUCE N. WHITLOCK
BY George H. Fritzinger
AGENT

INVENTORS
RICHARD KOBLER
BRUCE N. WHITLOCK
BY George H. Fritzinger
AGENT

REPEAT MAGNETIC TAPE MACHINE

INVENTORS
RICHARD KOBLER
BRUCE N. WHITLOCK
BY George H. Fritzinger
AGENT

INVENTORS
RICHARD KOBLER
BRUCE N. WHITLOCK
BY George H. Fritzinger
AGENT

United States Patent Office 3,531,575

Patented Sept. 29, 1970

3,531,575

REPEAT MAGNETIC TAPE MACHINE

Richard Kobler, West Orange, and Bruce N. Whitlock, Morris Plains, N.J., assignors to McGraw-Edison Company, Elgin, Ill., a corporation of Delaware Filed Sept. 3, 1968, Ser. No. 757,000

Int. Cl. G09b *5/04;* G11b *15/18*

U.S. Cl. 35—35 16 Claims

ABSTRACT OF THE DISCLOSURE

The invention relates to a magnetic tape recording which is conditioned to rewind automatically to start position the instant the play-record button is released. Thus, whether the pupil has finished a recording or has finished playing a recording the machine is made ready to play back the recording, repeat the playback thereof or to make a new recording the instant the play-record button is released. The machine is battery operated and therefore to preserve battery life a timing circuit is provided to shut off the power when either the record or play button is released and not reoperated within a predetermined time interval. In a preferred example of the invention an adapter is provided which is attachable to a standard commercial cartridge tape recorder to condition the recorder to operate in the manner described as a repeat machine without requiring any internal or external alteration of the cartridge recorder.

BACKGROUND OF THE INVENTION

There is great need in the teaching field for a phonographic machine which is conditioned to record the pupil's voice by simply pressing a "record" button, and which is started instantly to play back the recording from the beginning simply by releasing the record button and pressing a play button. Furthermore, there is a need that such machine be made immediately ready either for repeating the play back of the recording or for making a new recording when the play button is released. Such machine is particularly useful for teaching speech, languages, or vocal or instrumental music. For example, in teaching languages, it enables a pupil to compare his pronunciation at any time with that of a teacher's voice, or to repeatedly re-record a phrase and instantly listen back to the same as a practise exercise to achieve clearer enunciation without having to perform any complicated control manipulations on the machine which would distract his attention from the subject matter being taught. Existing recording machines require the operation of "record," "rewind," "play" and "stop" controls to perform such simple record and play back operations. Such controls are typically manually operable buttons, but whether they are hand or foot operated, a pupil cannot operate more than two separate controls without any conscious effort, since to have to operate three of four controls requires specific thought as to the selection of the controls and further thought as to the sequence of their operation.

It is an object of the invention to provide a novel cartridge tape recorder which will rewind the tape automatically the instant the play or record button is released and particularly to provide an adapter which can be attached readily to a commercial cartridge tape recorder without modifying the latter and which when so attached will convert the recorder to operate as a repeat machine.

Another object is to provide such battery-operated cartridge recorder which will cut off all power automatically within a preset time interval after rewind is completed unless the play or record button is again pressed within that interval to restart the machine.

These and other objects and features of the invention will be apparent from the following description and the appended claims.

In the description of the invention reference is had to the accompanying drawings, of which:

Figure 3:
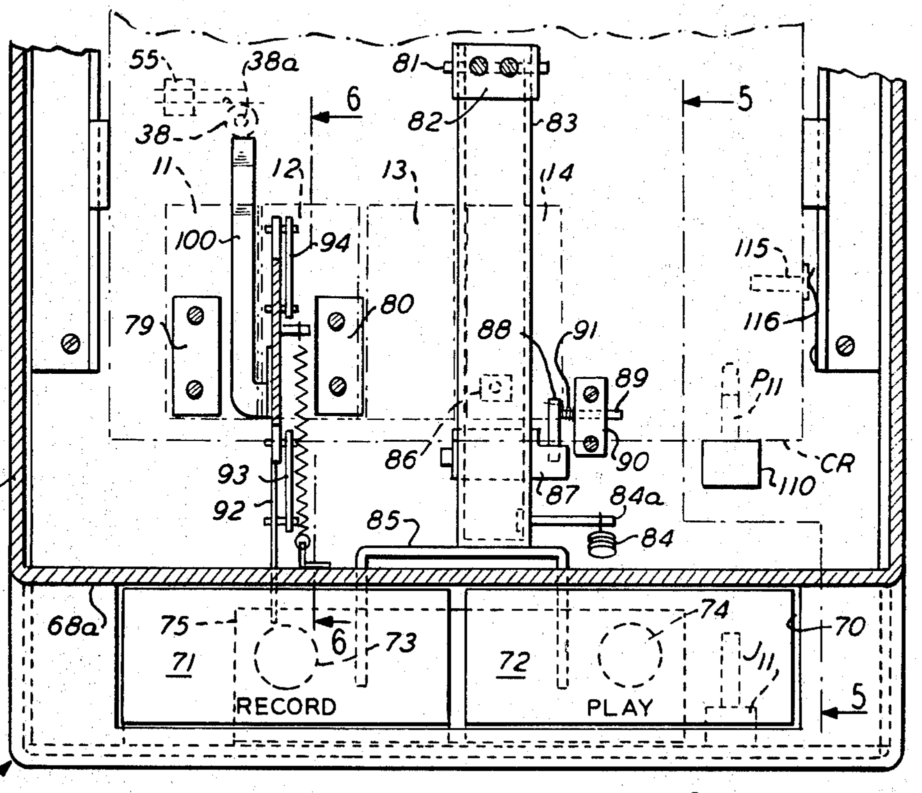
FIG. 3 is a plan view of a repeat adapter attachable to the standard tape recorder shown in FIG. 1 to condition it to operate as a repeat machine, with the upper portion of the case of the adapter being cut away on the line 3—3 of FIG. 5.
Figure 5:
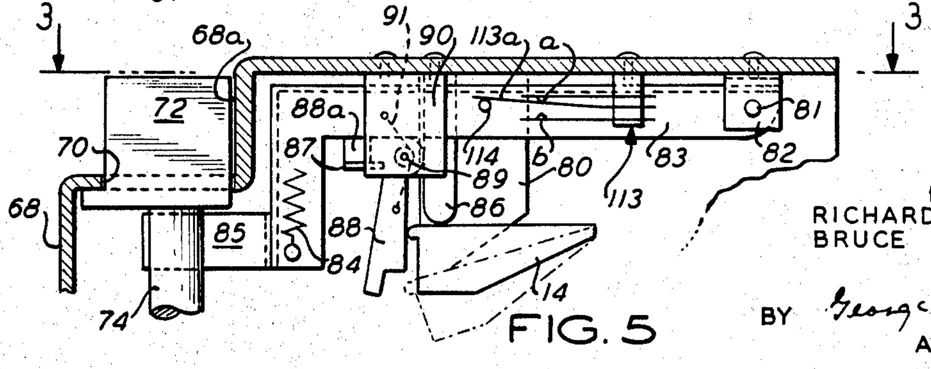
Figure 7:
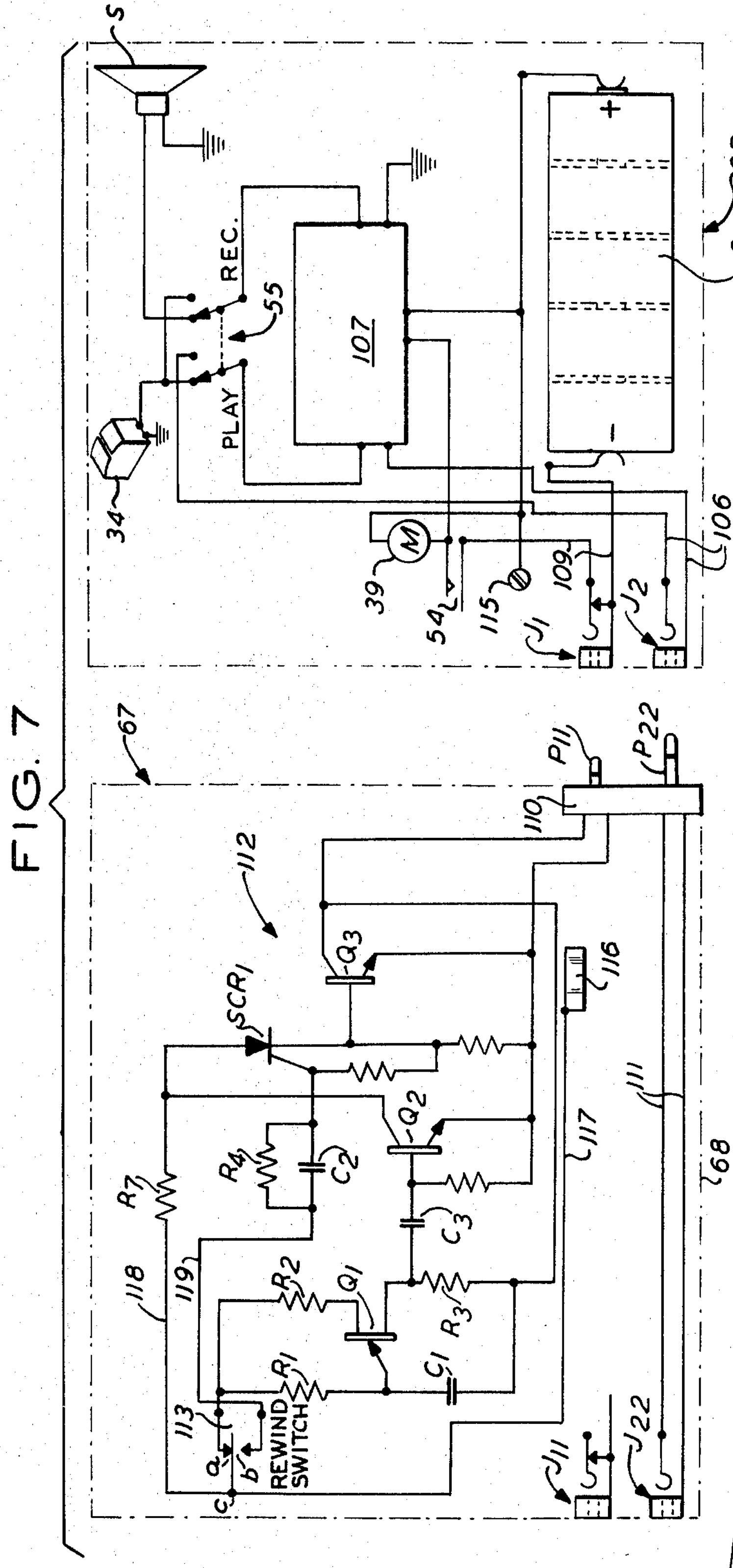
Figure 6:
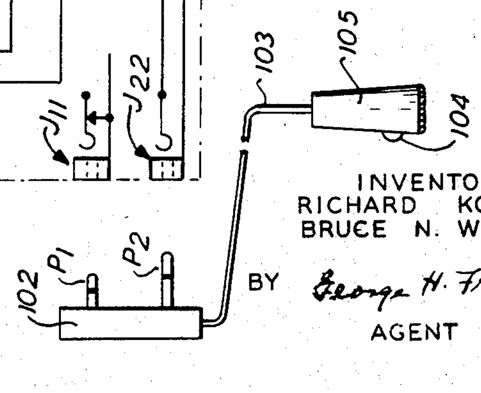
Figure 6:
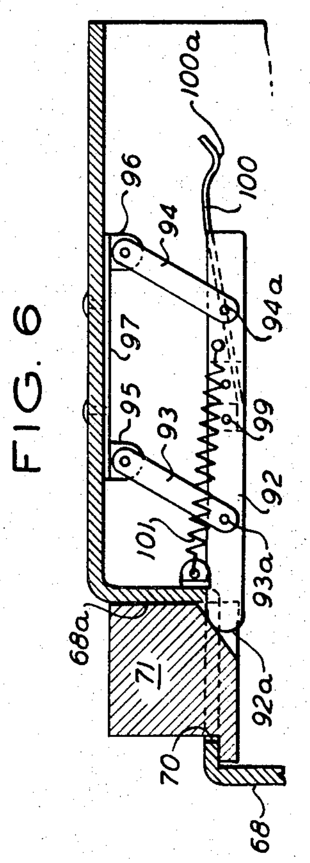
Figure 10:
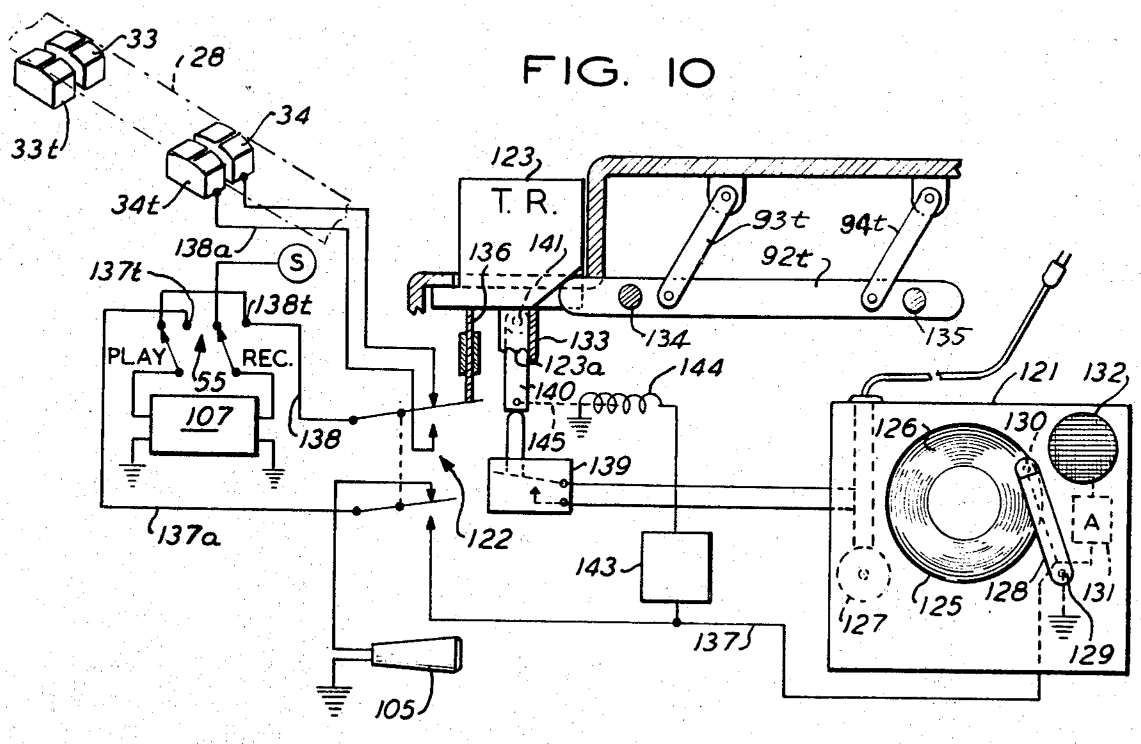
Figure 8:
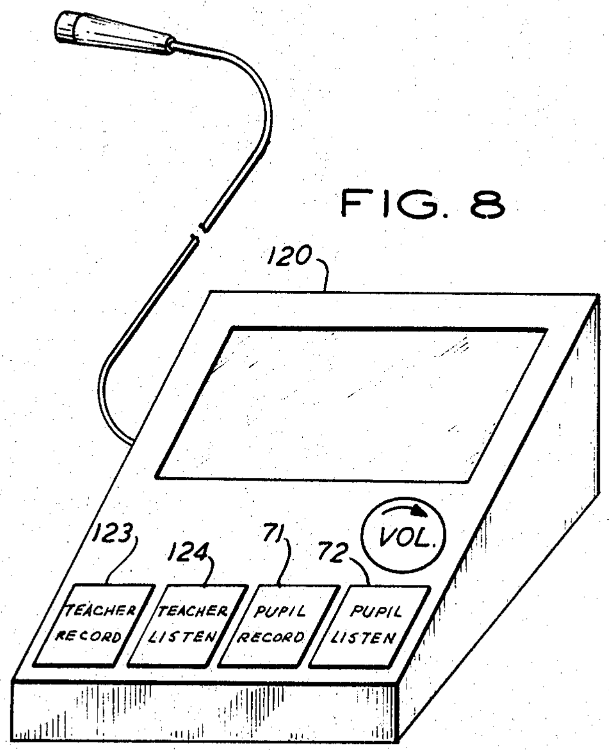
Figure 9:
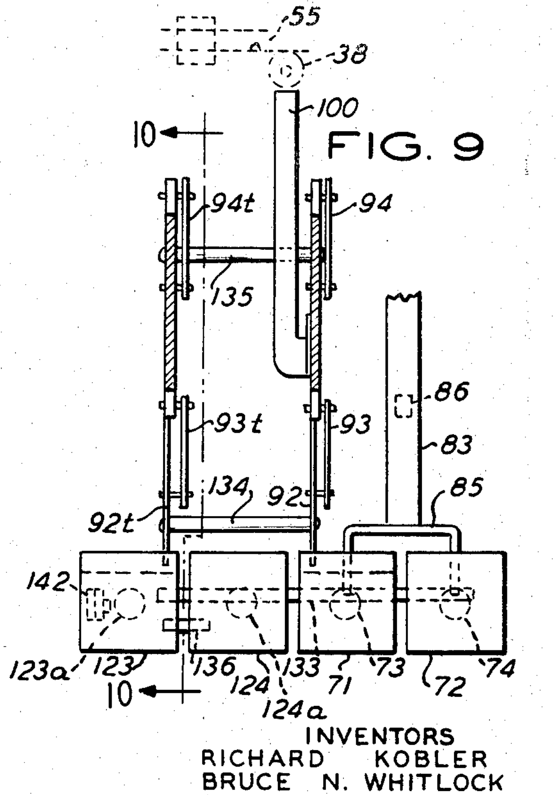

FIGS. 5 and 6 are fractional vertical sections taken on the lines 5—5 and 6—6 of FIG. 3;

FIG. 7 is a schematic circuit and diagram of the electric control apparatus of the recorder and adapter;

FIG. 8 is a perspective view of an alternative embodiment of a repeat machine operable selectively to record either a teacher's voice or the pupil's voice and to listen back immediately to the same;

FIG. 9 is a fractional plan view similar to FIG. 3 but showing modifications in the repeat adapter mechanism according to this alternative embodiment; and FIG. 10 is a partly schematic and diagrammatic view of circuits and mechanism according to this alternative embodiment with parts of the mechanism being shown as they appear from the line 10—10 of FIG. 9.

An important feature of a tape recorder for purposes of the present invention is that the operating mechanism be such as to permit the rewind button to be held permanently depressed to cause the normal "off" condition of the machine to be "rewind" with the result that whenever the play-record button is released the machine is placed instantly in rewind to return the tape to its start position. Commercial recorders which have this feature are known in the art, an example of one being the Motorola Model CP30FN described in Sams Photofact Magazine, volume 52, pages 61–72 published by Howard F. Sams & Co., Inc., Indianapolis, Ind. By way of example, the present invention is herein described in connection with a repeat adapter which when attached to such a commercial recorder will condition the recorder to rewind instantly when the play-record button is released.

Figures 1, 2:
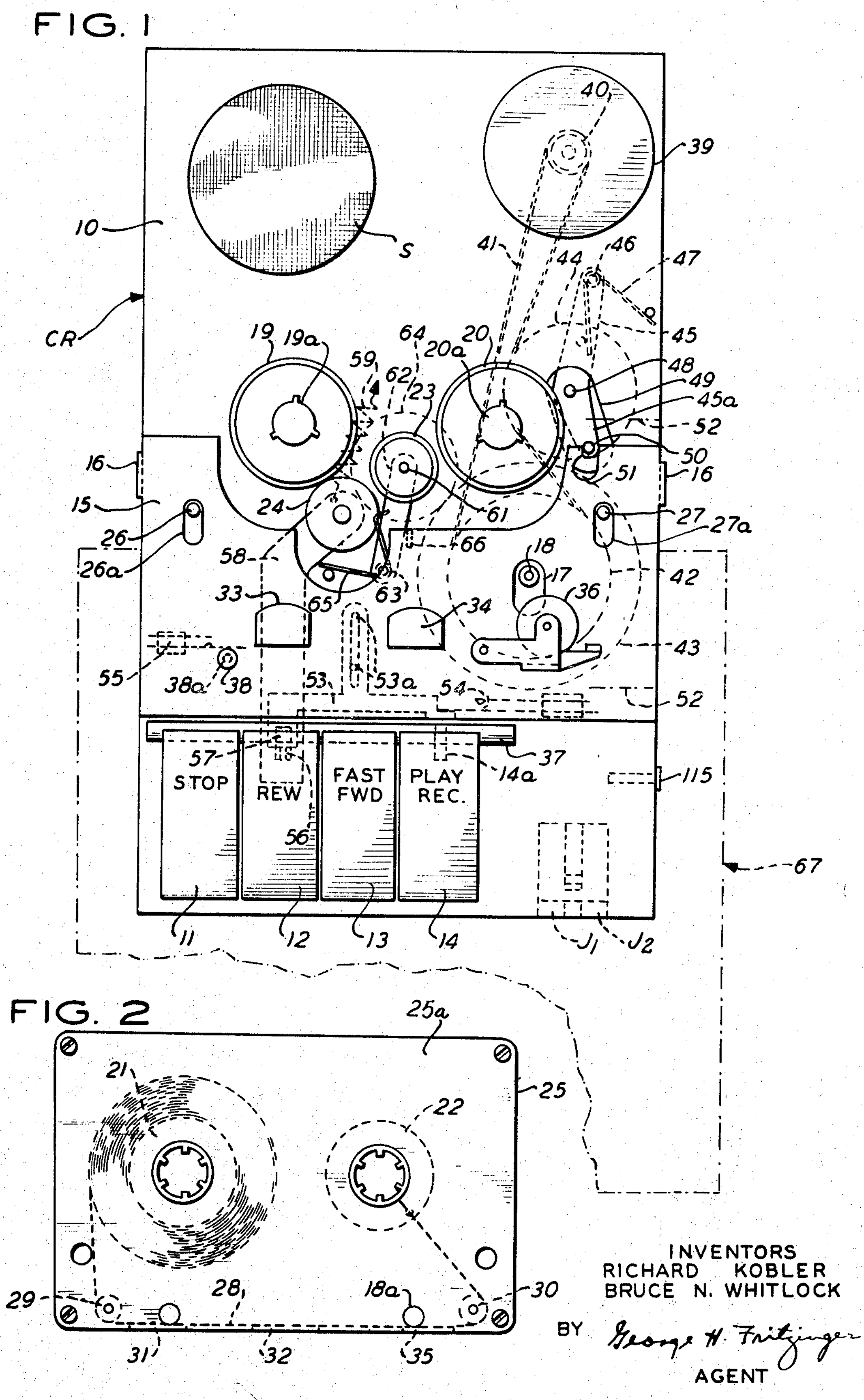
FIG. 1 is a plan view of a standard cartridge tape recorder with the outer case removed showing the operating mechanism.
FIG. 2 is a plan view of a cartridge or cassette for the tape recorder.
Figure 4:
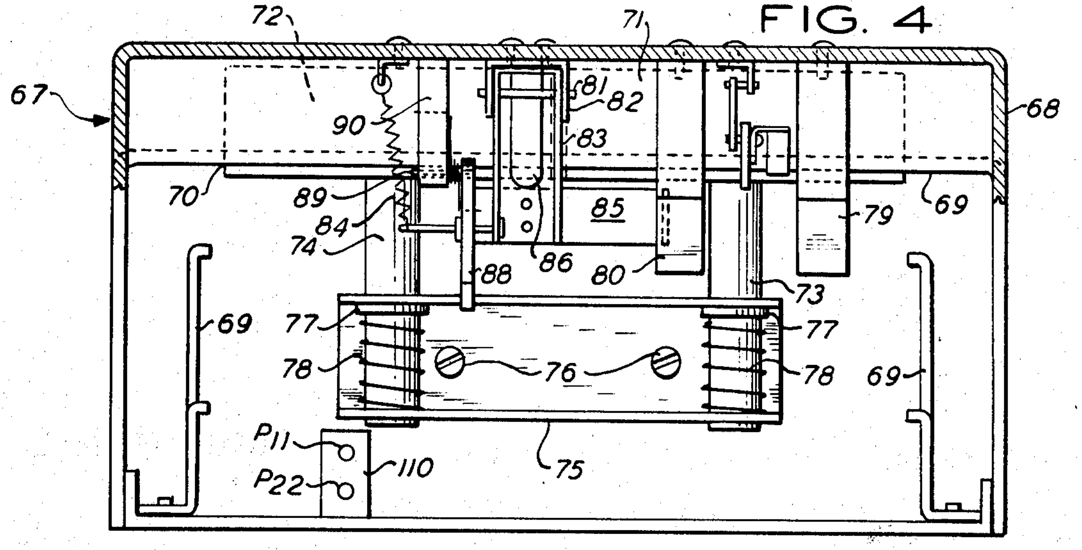
FIG. 4 is an elevational view from the open end of the repeat adapter.

A commercial recorder CR is provided of a portable type operating from a set of "C" batteries as indicated in FIG. 7. It has a rectangular chassis or frame 10 on the front portion of which are mounted depressible control members in the form of buttons 11–14 labeled "Stop," "REW" (Rewind), "Fast Fwd" (Forward) and "Play-Rec." Directly back of the control buttons is a slide plate 15 guided on the frame by turned down lugs 16 at the sides. The slide plate has a clearance opening 17 for a tape drive capstan 18 and is cut out at the rear to clear a pair of friction drive wheels 19 and 20 for supply and take-up reels 21 and 22 and for a fast forward friction wheel 23 and a rewind wheel 24. The reels are mounted in the left and right portions of a removable cartridge 25 having a plastic molded case 25*a* as shown in FIG. 2. The cartridge is pressed down onto a pair of locating pins 26 and 27 upstanding from the frame through clearance openings 26*a* and 27*a* in the slide plate 15. As the cartridge is so mounted the internally splined hubs on the reels 21 and 22 are pressed onto respective ribbed spindles 19*a* and 20*a* on the drive wheels 19 and 20 and a capstan 18 is extended through a clearance opening 18*a* in the case 26.

A magnetic tape 28 is drawn from the supply reel 21 around guide rollers 29 and 30 in the cartridge to the take-up reel 22. Portions of the run of the tape between the two guide rollers are exposed by front cut-outs 31 and 32 in the cartridge to permit erase and record-reproduce heads 33 and 34 on the slide plate 15 to be moved into and out of engagement with the tape. These heads may be one unit with minimum spacing between the gaps if desired. Only the leading end portion of the tape from the tape-up reel short of extending to the record-reproduce head 34 is a non-magnetic leader tape. This is done so that the machine will be able to record and play from the start after rewind. Another cut-out 35 in the cartridge permits a spring loaded roller 36 on the slide plate to be moved into and out of the cartridge to place the tape into and out of driving engagement with the drive capstan 18.

The control buttons 11–14 are pivoted on a cross shaft 37 and the usual latches and interlocks (not shown) are provided so that the rewind button 12 and play-record button 14 will become latched when depressed and each when depressed will unlatch the other if the other is already latched. The stop button is operative only to unlatch whichever of the other buttons is standing latched at the time. The fast forward button 13 plays no part in the operation of the recorder for the purposes of the present invention and is not herein described. The machine stands normally in play condition with the result that upon pressing the play-record button 14 the machine is started running to play the recording on the tape. However, upon holding down a record button 38 on the slide plate 15 when the play-record button 14 is depressed, the machine is started running in record condition, as will appear.

The drive mechanism shown in FIG. 1 comprises a D.C. motor 39 having a drive pulley 40 at its lower end coupled by a belt 41 to a pulley 42 on a flywheel 43. One run of the belt is led around a take-up pulley 44 journaled on a lever 45 pivoted at 46 to the frame 10. A torsion spring 47 urges the lever clockwise to keep the belt taut. A drive spindle 48 extends upwardly from the take-up pulley 44 through an oblong clearance opening 49 in the top wall of the frame. Also, an arm 45*a* extends from the lever 45 and carries a pin 50 which projects up through the opening 49. The pin 50 engages a cam slot 51 in the slide plate 15 to hold the spindle 48 away from the drive wheel 20 when the slide plate is in its forward or unoperated position, and to allow the spindle 48 to engage the wheel 20 responsive to the pressure of the spring 47 when the slide plate is pressed rearwardly to its operated position indicated by the fractional dash-dot lines 52 in FIG. 1. It is only the play-record button 14 of the buttons 11–14 which is operable against the slide plate 15 via a depending finger 14*a* on the button to move this plate rearwardly as the button is depressed. This rearward movement of the slide plate not only engages the spindle 48 with the friction wheel 20 to provide a coupling from the drive motor 39 to the take-up reel to cause the latter to take-up the tape during play and record operations, but also (1) it engages the pressure roller 36 with the tape to couple the tape to the drive capstan 18, (2) it brings the erase and play-record heads 33 and 34 into engagement with the tape, and (3) it moves a yoke 53 slidably mounted at 53*a* on the frame 15 to close an on-off switch 54 on the frame 15 to prepare the start circuit for the drive motor 39. Thus, the machine is started running in play condition, with the head 34 connected to the input of the amplifier and the speaker S to the output of the amplifier, when the play-record button 14 is depressed provided the start-stop switch on the microphone is also closed as is later described (FIG. 7).

However, if the record button 38 is held depressed as the play-record button 14 is depressed, a depending pin 38*a* of the record button is now in position to be moved against a record-reproduce switch 55 whereby to operate the switch by the movement of the slide plate. This operation of the switch 55 places the machine electrically into record condition by connecting the microphone to the input of the amplifier and the head 34 to the output of the amplifier, just prior to the machine being started.

A pressing of the rewind button 12 operates a depending finger 56 to perform two mechanical operations without moving the slide plate 15: (1) it moves the yoke 53 rearwardly to close the on-off switch 54, and (2) through engagement of the finger 56 with a slot 57 in a slide bar 58 on which the rewind roller 24 is journaled the slide bar is relieved so that it is moved rearwardly by a tension spring 59 to draw the rewind roller 24 between the idler roller 23 and the friction wheel 19 for the supply reel. The idler friction wheel 23 is journaled at 61 on a lever 62 pivoted at 63. Integral with the wheel 23 is a larger friction wheel 64 which rides on the fly wheel 43 responsive to the biasing of the lever 62 by a torsion spring 65. The engagement of the rewind roller 24 with the friction wheel 19 and idler friction wheel 23 therefore couples the supply reel to the drive motor to draw the tape from the take-up reel 22 past the capstan 18 (the pinch roller 36 being not now engaged) and rewind the tape on the supply reel 21. If the rewind button 12 is pressed down when the play-record button 14 is pressed and rearward movement of the slide plate 15 produced by the play-record button causes a lug 66 on the slide plate to cam the lever 62 counterclockwise to disengage the friction wheel 64 from the flywheel 43. The rewind drive is therefore disengaged to allow the machine to be put in play or record condition in the normal way. If the play-record button is released while continuing to hold the rewind button 12 depressed, the rewind drive is restored to cause instantaneous rewinding of the tape. When the rewind is completed the tape drive is jammed by reason of a closed end loop of tape on the take-up reel 22, but the motor 39 will continue to run by reason of the on-off switch 54 being held closed by the continuing depressing of the rewind button 13. This running of the motor produces a slippage of the motor drive pulley 40 on the belt 41 but is permitted to continue for only a limited period by the repeat adapter as is herein later described.

The repeat adapter 67 comprises a case 68 open at the back end. Spaced from the sidewalls of the adapter are guide plates 69 to receive slidably the front half portion of the cartridge recorder CR with just a clearance fit. The top wall of the case has a downward step 68*a* at the front provided with a wide slot 70 laterally of the case. Extending upwardly through this slot are two side-by-side depressible buttons of a suitable plastic flush with the top wall: a left record button 71 and a right play button 72. Secured to these buttons as by press fit are depending metal posts 73 and 74 which slidably engage respective pairs of vertically aligned apertures in a U bracket 75 secured by screws 76 to the front wall of the case at a distance from the base of the case. Retainer rings 77 secured to the post 73 and 74 abut against the underside of the upper leg of the U bracket to define the uppermost position of the buttons 71 and 72. Compression springs 78 on the posts between these retainer rings and the bottom leg of the U bracket bias the buttons into their upper positions.

Secured to the underside of the top wall of the adapter case are two depending cam blocks 79 and 80. When the recorder is slid into the adapter case these cam blocks are moved onto the stop and rewind buttons 11 and 12 of the cartridge recorder CR to cam the buttons down and to hold the same permanently depressed so long as the recorder is mounted in the adapter.

Pivoted at 81 to a bracket 82 on the top wall of the adapter case near the rear end thereof is a lever 83. This lever extends forwardly from its pivot point and has a U-shaped bar 85 secured to the forward end thereof the opposite arms of which underlie the buttons 71 and 72 and are held thereagainst by the force of a spring 84 connected between a side arm 84*a* of the lever and the top of the case. Depending from a midposition of the lever 83 is a finger 86 as of plastic which overlies the play-record button 14 of the recorder when the recorder is mounted in the adapter. Thus, whether the record or play button 71 or 72 of the adapter is depressed, it is moved against the U-bar 85 to depress the lever 83 and cause the play-record button 14 of the recorder to be operated.

Extending rightwardly from the lever 83 is an arm 87 and at the back of this arm at the side of the lever 83 is a catch lever 88 pivoted at 89 to a block 90 depending from the top wall of the adapter. This catch lever is of a bell crank shape having a leg 88*a* overlying the arm 87 of the lever 83. The catch lever is biased rearwardly by a torsion spring 91 (FIG. 5) to a position determined by abutment of the leg 88*a* against the arm 87. When either the play or record buttons of the repeat adapter is depressed the arm 87 releases the catch lever to cause it to be moved against the button 14 and to latch the button when the latter reaches its depressed position. Upon release of the depressed repeat button 71 or 72 the arm 87 strikes the underside of the leg 88*a* and disengage the catch lever from the play-record button 14 allowing the button to snap upwardly to its unoperated position.

Located between the cam blocks 79 and 80 is a bar 92 supported by two parallel links 93 and 94 for parallel movement with the top of the case 68. The links 93 and 94 are pivoted to respective lugs 95 and 96 turned down from a bracket 97 secured to the top wall of the case and are pivoted respectively at 93*a* and 94*a* to the bar 92. Bracketed at 99 to the bar 92 is a rearwardly extending cantilever spring 100 provided with a V-shaped tip 100*a*. A tension spring 101 connected between the bar 92 and the case 68 holds the bar 92 normally in a forward position wherein the links 93 and 94 are oblique to the bar and the forward tip 92*a* of the bar underlies the record button 71. In the initial depressing of the record button 71 the bar 92 is moved downwardly and rearwardly in view of the initial oblique positioning of the links 93 and 94 until the tip of the bar 92 rides off the bottom of the button and slidably engages the back side thereof. In this downward rearward movement of the bar 92 the V tip 100*a* of the spring 100 is moved downwardly and rearwardly onto the record button 38 to depress it into its operated position. When the button 71 is released the parallel mechanism is restored to its initial positioning to release the record button 38. This depressing of the repeat-record button 71 therefore operates first the record button 38 of the cartridge recorder CR and then the play-record button 14 of the recorder to put the recorder into its record condition; however, a depressing of the repeat play button 72 operates only the play-record button 14 to put the machine in play condition. Upon release of either the record button 71 or play button 72 of the adapter the cartridge recorder CR is restored immediately into rewind condition to condition it for an immediate play or record operation.

The cartridge recorder CR has a pair of jacks $J_1$ and $J_2$ mounted on its front panel (FIGS. 1 and 7) into which can be inserted a microphone plug 102 comprising individual plugs $P_1$ and $P_2$ connected by a cable 103 respectively to a start-stop switch 104 and a microphone 105. The jack $J_2$ is connected by a circuit 106 into the audio amplifier of the cartridge recorder CR diagrammatically indicated at 107. This audio amplifier and the motor 39 have a common lead connection 108 to the plus side of the battery C. The jack $J_1$ is of a shorting type which when unplugged connects negative side of the battery C via leads 109 and the on-off switch 54 to the amplifier 107 and motor 39. When the plugs $P_1$ and $P_2$ are inserted in the jacks $J_1$ and $J_2$, the jack $J_1$ connects the start-stop microphone switch 104 in the circuit 109 in series with the on-off switch 54, and the jack $J_2$ connects the microphone 105 to the audio amplifier. Thus, when the microphone is plugged in the machine, the start-stop switch 104 must be closed to operate the machine. This switch 104 is typically of a slide type permitting it to be readily latched in an on condition as may be desired. The recorder can however be operated in play condition when the microphone is unplugged because the jack $J_1$ is of the self shorting type.

The repeat adapter 67 has an internal double plug 110 comprising individual plugs $P_{11}$ and $P_{22}$, the same as the plugs $P_1$ and $P_2$, which engage the jacks $J_1$ and $J_2$ as the recorder is inserted into the case 68 of the adapter. On the front panel of the adapter 67 is a pair of jacks $J_{11}$ and $J_{22}$ the same as the jacks $J_1$ and $J_2$. The jack $J_{11}$ is unconnected but the jack $J_{22}$ is connected by leads 111 in parallel with the plug $P_{22}$. Thus, when the microphone plug 102 is inserted into the jacks $J_{11}$ and $J_{22}$ of the adapter the microphone 105 is connected through to the audio amplifier of the recorder CR but the start-stop switch 104 is left unconnected in an inoperative condition. This is done because the adapter comprises a time delay circuit 112 connected to the plug $P_{11}$ which is adapted to leave the motor 39 running for a limited time in rewind, typically about 10 seconds, after each release of the play or record buttons 71 or 72. This is done to preserve battery power and to avoid undue wear through slippage of the motor pulley 40 on the belt 41.

The time delay circuit 112 is controlled by a switch 113 (FIG. 5) which may be of the leaf spring type mounted cantilever fashion in an insulating stack on the top wall of case 68. The pole member 113*a* of the switch is shifted by a pin 114 on the lever 83 to make with the upper "*a*" contact when the push buttons 71 and 72 are not operated and is released to make with its lower "*b*" contact when either of the buttons 71 and 72 is depressed. When the cartridge recorder CR is inserted into the adapter case 68 the jack $J_1$ connects the collector of a transistor switch $Q_3$ via the on-off switch 54 to the negative side of the audio amplifier 107 and motor 39, and it connects the emitter of the transistor $Q_3$ to the negative side of the battery C. The plus side of the battery is connected to the frame or chassis 10 of the cartridge recorder CR. This frame has typically one or more screw heads which are exposed through the usual plastic outer case. One of these screw heads 115 (FIGS. 1 and 7) is in a sidewall of the tape recorder CR and is engaged automatically by a leaf spring 116 in the case 68 (FIGS. 3 and 7) when the recorder is mounted in the adapter case. The leaf spring 116 is connected by a lead 117 to the pole of the switch 113. In this way the common plus side of the battery C is carried through to the adapter without having to make any internal connection with the tape recorder CR.

A plus voltage is fed from the pole of the switch 113 via the lead 118 and resistor $R_7$ to the plate of a silicon controlled resistor $SCR_1$. When the switch 113 is engaged with its "*b*" contacts responsive to depressing the record or play button 71 or 72 the plus voltage is fed via a lead 119 and through resistor $R_4$ and condenser $C_2$ in parallel to the gate of the resistor $SCR_1$ to turn the same on. This applies a plus voltage to the base of the transistor $Q_3$ driving it into saturation to complete the power circuit to the amplifier 107 and motor 39, it being understood that the on-off switch 54 was also closed as the play or record button 71 or 72 was depressed. The cartridge recorder CR is therefore started in an operating condition.

When the play or record button 71 or 72 is released the switch 113 is returned to its "*a*" contacts to connect the plus side of the battery through a timing circuit $R_1C_1$ and the transistor $Q_3$ to the negative side of the battery. When the condenser $C_1$ becomes charged to a predetermined triggering voltage the transistor $Q_1$ is rendered conductive to feed a voltage pulse through the condenser $C_3$ to transistor $Q_2$ to drive it into saturation. This saturation drops the voltage across the resistor $SCR_1$ to unlatch the same and turn off the transistor $Q_3$. As the transistor $Q_3$ is turned off the current supply is shut off to the motor 39 and audio amplifier 107 as well as through the timing circuit $R_1C_1$. Thus, the recorder CR remains running after each release of the play or record button 71 or 72 for a predetermined time determined by the timing circuit $R_1C_1$ and thereupon all current drain from the battery C is cut off. If the pupil depresses the recorder play button 71 or 72 before the timing circuit has cut off the recorder the transistor $Q_3$ is immediately saturated and the timing operation is delayed until the play or record button 71 or 72 is again released.

In FIGS. 8, 9 and 10 there is shown an alternative embodiment of a repeat tape recorder 120 which differs from the first embodiment in that it is adapted also for recording a teacher's voice from a phonograph 121 and for immediately playing back the same, as desired. For this additional purpose, the cartridge recorder CR is modified only in that it is provided also with erase and record-reproduce heads 33T and 34T mounted alongside the pupil's erase and record-reproduce heads 33 and 34 respectively, and in that the tape 28 is made sufficiently wide to receive an extra track from the head 34T. Since the amplifier 107 is used for both heads, a selector switch 122 is added which in its normal position retains the switching functions of the record-reproduce switch 55 the same as before described. However, when the selector switch 122 is operated and the record-reproduce switch 55 is in record position, the teacher's voice is recorded from the phonograph 121 via the amplifier 107 and the head 34T, and when the selector switch 122 is operated and the record-reproduce switch 55 is in reproduce position the teacher's voice is reproduced from the head 34T via the amplifier 107 and the pupil's speaker S, as will appear.

The modified repeat tape recorder differs outwardly from the adapter 67 in that it has two additional push buttons 123 and 124 marked respectively "Teacher Record" and "Teacher Listen." The two remaining buttons 71 and 72 are marked respectively "Pupil Record" and "Pupil Listen" and have the same functions as before. The additional buttons 123 and 124 have depending posts **123*a* and 124*a* by which they are slidably mounted in the manner of the buttons 71 and 72**.

The phonograph 121 may operate from any record medium and may, for example, be a standard disk player of a quick-start type having a turntable 125 carrying a specially prerecorded disk record 126, a motor 127 for driving the turntable, a pickup arm 128 pivoted at 129 and carrying a reproducer 130 at its free end, an amplifier 131 and a speaker 132. The record 126 is recorded with successive statements or pronunciations of the teacher relating to the items of the subject being taught, and each recorded item is terminated with a stop signal adapted to stop the drive motor 127, as later described.

As shown in FIG. 9, the pupil's record and play buttons 71 and 72 operate against the U bar 85 to depress the lever 83, and the latter operates through a depending finger 86 to depress the play-record button of the cartridge recorder CR. Also, the pupil's record button cams the parallel motion bar 92 to shift this bar rearwardly and cause the cantilever spring 100 to depress the record-reproduce switch 55. These operations are the same as in the previous embodiment. However, in the revised embodiment, a cross member 133 is secured to the U bar 85 and underlies both the teacher's record and listen buttons 123 and 124 so that a depressing of either of these buttons will also operate the play-record button 14 of the cartridge recorder CR. Further, the parallel motion bar 92 is joined by two cross studs 134 and 135 to a second parallel motion bar referred to by the same number 92 with the suffix letter *t*. This second bar **92*t* is supported in the same manner as the bar 92 and is positioned to coact with the teacher's record button 123 in the same way as the bar 92 coacts with the pupil's record button 71. Additionally, the teacher's record button 123 operates against a plunger 136 to shift the selector switch 122 to its operated position wherein it connects the pickup head 130 of the phonograph 121 via lead lines 137 and 137*a* to the input record terminal 137*t* of the record-reproduce switch 55 and it connects the output record terminal 138*t* of the switch 55 via lead lines 138 and 138*a* to the teacher's record-reproduce head 34*t*. Thus, upon depressing the teacher's record button 123 the play-record button 14 of the cartridge recorder CR is depressed and both the record-reproduce switch 55 and the selector switch 122 are operated to start the repeat machine running to record from the phonograph 121**.

Also, upon depressing the teacher's record button 123 a start switch 139 is closed to start the phonograph 121. For this purpose a link 140 is pivoted at 141 to a bracket 142 on the underside of the button 123. This link is biased forwardly by any suitable means not shown into the position shown in FIG. 10. In this position the lower end of the link overlies a push button of the switch 139 so as to operate this switch to closed position as the button 123 is depressed. This operation of the switch 139 starts the phonograph player 121 concurrently as the cartridge recorder CR is started, causing the teacher's voice picked up from the disk record 126 to be fed through the amplifier 107 and recorded by the head **34*t* on the tape 28. When the head 130 picks up a stop signal from the disk record of a selected frequency, the same is fed into a stop recognition circuit 143 to provide an output signal for operating a solenoid 144. This solenoid is mechanically coupled to the link 140 as indicated by the tie line 145 so that it will draw the link off from the push button of the switch 139 and allow the switch 139 to return to open position and stop the phonograph 121. The stop signal is picked up only momentarily with the result that the solenoid 144 is deenergized by the time the phonograph is stopped. Thus, when the pupil releases the teacher's record button 123, the link 140 will pivot by its biasing into a position over the top of the switch button and render the teacher's record button 123 operative again to start the phonograph 121 when the button 123** is again depressed.

The teacher's listen button 124 is required to operate the play-record button 14 of the cartridge recorder CR—which it will do through the cross member 133 as already described—and also the selector switch 122 since the pupil is now to listen to a reproduction picked up from the track on the tape 28 with which the head **34*t* registers. For this latter purpose, the plunger 136 is made sufficiently wide to underlie also the teacher's listen button 124 so that the teacher's listen button 124 will also operate the selector switch 122 as shown in FIG. 9. The voice signals now picked up by the head 34*t* are fed through the amplifier 107** to the pupil's speaker S.

The embodiments of our invention herein particularly shown and described are intended to be illustrative and not necessarily limitative of our invention since the same are subject to changes and modifications without departure from the scope of our invention, which we endeavor to express according to the following claims.

We claim:

1. A repeat machine including a tape recorder-reproducer comprising supply and take-up reels, a drive motor for advancing a tape from said supply reel to said take-up reel, a play-record control member, a rewind control member, a rewind drive mechanism for coupling said supply reel in reverse direction to said drive motor at an above-normal speed, means for causing said rewind drive mechanism to be held uncoupled when the rewind control member is not operated and to be biased into coupled relationship when said rewind control member is operated, means responsive to operating said play-record control member while said rewind control member is operated for uncoupling said rewind drive mechanism, means for locking said rewind control member in operated position, and push means operable while said rewind control member is in locked condition for operating and releasing said play-record control member to shift said recorder-reproducer between operating and rewind conditions as said push means is depressed and released.

2. The repeat machine set forth in claim 1 wherein said recorder-reproducer includes means for latching said play-record control member when the same is depressed, a stop control member operable to unlatch said play-record control member, and means for locking said stop control member in operated position concurrently as said rewind control member is locked in operated position.

3. The repeat machine set forth in claim 1 wherein said recorder-reproducer includes a condition control member for determining whether the machine is conditioned for recording or reproducing when said play-record control member is operated, and wherein said push means includes a play button and a record button, one of which is depressible to operate only said play-record control member and the other of which is depressible to operate both said play-record control member and said condition control member.

4. The repeat machine set forth in claim 1 including an electronic switch for turning on and off electric power to the recorder-reproducer, means operable by said push means for placing said electronic switch in on condition as said play-record member is operated, and timing means activated as said play-record control member is released for causing said electronic switch to be turned off after a predetermined time interval.

5. The repeat machine set forth in claim 3 comprising an adapter attachable to said recorder-reproducer, said adapter including said locking means for operating said rewind control member into operated position as the adapter is attached to said recorder-reproducer, and said adapter including said play and record buttons move into coupled relationship with said play-record and conditioning control members as said adapter is attached to said recorder-reproducer.

6. In a repeat machine including a tape recorder-reproducer having supply and take-up reels, a tape drive capstan, a drive motor, rewind and play-record control members, means responsive to depressing said rewind control member to couple said motor to said supply reel to drive the tape at an above-normal speed in reverse direction to return the tape to a start position, and means responsive to depressing said play-record control member while said rewind control member is depressed for uncoupling said motor from said supply reel, pressing the tape in driving engagement with said capstan and producing a slip-clutch coupling between said take-up reel and said motor to cause the tape to be taken up under tension ahead of said capstan: a repeat adapter arranged for attachment to said tape recorder-reproducer, a push means on said adapter for depressing said play-record control member at will, and means in said adapter for holding said rewind control member permanently depressed while said adapter is attached to said recorder-reproducer whereby the non-use condition of said recorder-reproducer is in rewind to cause the tape to be rewound immediately to said start position when said push means is released.

7. The repeat machine set forth in claim 6 including a condition control member shiftable between record and reproduce positions for enabling said recorder-reproducer to be conditioned selectively for recording and reproducing when said play-record control member is depressed, said condition control member being biased in one of its positions, and wherein said push means of said adapter includes a play button operable to depress said play-record control member to start the recorder-reproducer in play condition and a record button operable to depress both said play-record control member and said condition control member to start the machine in record condition with the release of either of said play or record buttons returning the recorder-reproducer to rewind condition.

8. The repeat machine set forth in claim 7 including means for causing said rewind and play-record control members to become latched when the same are depressed, a stop control member depressible to unlatch said rewind and play-record control members, and means in said adapter for causing said stop control member to be held permanently depressed while said adapter is attached to said recorder-reproducer.

9. The repeat machine set forth in claim 7 wherein said adapter includes timing means for shutting off electric power to said recorder-reproducer when either the play or record buttons of said adapter is released and is not reoperated within a predetermined time interval.

10. The repeat machine set forth in claim 7 wherein said supply and take-up reels are in a replaceable cartridge including a recorder-reproducer translating head, and the tape from said supply roll to said head is operative to receive recording at the beginning of forward drive of the tape from said start position.

11. The repeat machine set forth in claim 7 including a microphone for receiving a pupil's voice during recording, said microphone having a start-stop control thereon for starting and stopping the drive of the tape during recording, a connector plug for connecting said microphone and start-stop control directly to said recorder-reproducer when the latter is used without said repeat adapter or alternatively for connecting only said microphone to said recorder-reproducer via said adapter when the latter is attached to said recorder-reproducer, and means in said adapter for rendering said push buttons effective for starting said recorder-reproducer including timing means activated by release of said push buttons for cutting off power to said recorder-reproducer upon elapse of a predetermined time interval after said release.

12. A repeat machine including a tape recorder-reproducer comprising supply and take-up reels, a drive motor for advancing a tape from said supply reel to said take-up reel, a shiftable play-record control member biased into unoperated position, a rewind drive mechanism for coupling said supply reel in reverse direction to said drive motor at an above-normal speed, means biasing said rewind drive mechanism into coupled relationship, and means responsive to depressing and releasing said play-record control member for moving said rewind mechanism into uncoupled relationship and for restoring the same, and for concurrently placing said recorder-reproducer into operating and non-operating conditions whereby upon depressing and releasing said play-record control member said recorder-reproducer is shifted between operating and rewind conditions.

13. A repeat machine as set forth in claim 16 including, first and second record-reproduce heads mounted to engage separate tracks on said tape, microphonic and phonographic sources of sound to be recorded selectively on said tape via said respective record-reproduce heads, first and second record control buttons on said machine for said first and second heads operable selectively to record from said microphonic source via said first head or from said phonographic source via said second head, first and second listen control buttons on said machine for said first and second heads operable selectively to reproduce the recorded microphonic sound from said first head or the recorded phonographic sound from said second head, and means responsive automatically to the release of said respective control buttons for immediately activating said drive means to rewind the tape advanced from said supply reel whereby to condition the recorder-reproducer machine for immediate reoperation from a start position on the tape.

14. The tape recorder-reproducer machine set forth in claim 13 including a start control for said phonographic source of sound, means responsive to depressing said second record control button associated with said phonographic source for operating said start control, said phonographic source terminating with a stop signal of predetermined frequency, means responsive to pickup of said stop signal for uncoupling said start control from said second record control button to stop the phonographic source, and means responsive to subsequent release of said second record control button for recoupling the same to said start control.

15. The tape recorder-reproducer machine set forth in claim 13 wherein said microphonic sound source is of the pupil's voice and said phonographic sound source is of the teacher's voice, including a speaker associated with the phonographic sound source permitting the pupil during recording of the teacher's voice to hear directly the teacher's voice and to gauge when to release the second record-control button when the teacher's voice ends, a speaker in said tape recorder-reproducer machine, and means effective upon depressing said second listen control button for reproducing said teacher's voice via the speaker of said tape recorder-reproducer machine.

16. The tape recorder-reproducer machine set forth in claim 13 including a start control for said phonographic source of sound, means responsive to depressing said second record control button associated with said phonographic source for operating said start control, said phonographic sound source terminating with a stop signal of predetermined frequency, means responsive to pickup of said stop signal for stopping the phonograph, and means responsive to release of said record control button for rendering the same operative to restart the phonographic source of sound.

References Cited

UNITED STATES PATENTS

| | | | |
|---|---|---|---|
| 2,787,669 | 4/1957 | Flan et al. | |
| 3,156,052 | 11/1964 | Irazoqui | 35—35.3 |
| 3,373,951 | 3/1968 | Mazoyer | 242—200 |

WILLIAM H. GRIEB, Primary Examiner

U.S. Cl. X.R.

242—200; 179—100.2